(12) United States Patent
Schall et al.

(10) Patent No.: US 6,235,252 B1
(45) Date of Patent: *May 22, 2001

(54) METHOD FOR RECOVERING NITRATE IONS AS NITRIC ACID FROM NUCLEAR INDUSTRY EFFLUENTS

(75) Inventors: Gilbert Schall, Narbonne; Antoine Floreancig, La Murette; Sylvie Davied, Narbonne, all of (FR)

(73) Assignee: Comurhex S.A., Velizy Villacoublay Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/091,247

(22) PCT Filed: Dec. 12, 1996

(86) PCT No.: PCT/FR96/01992

§ 371 Date: May 5, 1999

§ 102(e) Date: May 5, 1999

(87) PCT Pub. No.: WO97/22126

PCT Pub. Date: Jun. 19, 1997

(30) Foreign Application Priority Data

Dec. 12, 1995 (FR) .................................... 95 14884

(51) Int. Cl.$^7$ .......................... C01B 21/20; C01B 21/40; C01G 43/00
(52) U.S. Cl. ............... 423/20; 423/393; 423/400
(58) Field of Search ................ 423/393, 10, 20, 423/400

(56) References Cited

U.S. PATENT DOCUMENTS

| 2,935,840 | * | 5/1960 | Schoppe | ............. | 60/39.74 |
| 4,098,871 | * | 7/1978 | Schoppe | ............. | 423/177 |
| 4,225,455 |   | 9/1980 | Haas | .................. | 252/301.1 |
| 5,149,515 | * | 9/1992 | Karner et al. | ............ | 423/DIG. 1 |

FOREIGN PATENT DOCUMENTS 2410870  8/1979  (FR) .

* cited by examiner

Primary Examiner—Wayne Langel
(74) Attorney, Agent, or Firm—Millen, White, Zelano & Branigan, P.C.

(57) ABSTRACT

A method for recovering nitrate ions as nitric acid from nuclear industry effluents by thermally decomposing the nitrate ions in solution, and recovering the $NO_x$ vapors generated by the heat treatment in an aqueous medium. The resulting nitric acid may be recycled in the nuclear industry.

22 Claims, No Drawings

METHOD FOR RECOVERING NITRATE IONS AS NITRIC ACID FROM NUCLEAR INDUSTRY EFFLUENTS

FIELD OF THE INVENTION

The invention relates to a process for recovering, in the form of nitric acid, the nitrate ions contained in the aqueous effluents from the nuclear industry, by thermal decomposition of these nitrate ions in solution and recovering in an aqueous medium the $NO_x$ vapours generated by this thermal treatment.

The invention also relates to a process for recovering, in the form of nitric acid, the nitrate ions contained in the aqueous effluents from the nuclear industry, by thermal decomposition of these nitrate ions and recovering in an aqueous medium the $NO_x$ vapours generated, the nitric acid being intended to be recycled into the nuclear industry:

for dissolving the uranium-bearing concentrates coming from the processing of uranium-bearing ores;

or for dissolving nuclear fuel pellets:

before they are implemented in a nuclear reactor, i.e. originating from their production line, in the form of pellets exhibiting defects or in the form of waste originating from stages such as forming or pressing of uranium oxide or of a mixed oxide for the preparation of raw pellets, the sintering under reducing atmosphere, or else the precision grinding of the pellets obtained making it possible to give them their dimensions and to disclose possible texture defects such as cracks;

and/or at the end of life, after their irradiation in a nuclear reactor, their withdrawal from reactor, their cooling in pool, their grinding and conversion of their components into nitrates.

STATE OF THE ART

In the nuclear industry there are numerous stages of purification and/or of conversion of compounds into metal nitrates, such as those of uranium, plutonium, thorium, caesium, ruthenium, gadolinium, cerium or others.

These nitrates are subsequently decomposed thermally into metal oxides with the occuring of a gaseous effluent which contains steam and $NO_x$ nitrous vapours.

In its complete cycle, ranging from its mining extraction to its implementation as fuel in atomic power stations, uranium originating from uranium-bearing ores is supplied in the form of a uranium-bearing concentrate of various compositions, such as uranate of magnesium, sodium, potassium or ammonium, or still uranium-bearing concentrates made up of oxides such as $U_3O_8$ or peroxides such as $UO_4, nH_2O$. These uranium-bearing concentrates still contain many disturbing impurities which must be removed because of their incompatibility with the uranium cycle comprising conversion, enrichment and production of the fuel.

In fact, before its fuel qualities are obtained, uranium may pass through a hydrofluorination stage (conversion into $UF_4$). From this stage, the uranium tetrafluoride obtained may lead either to the production of uranium metal feeding the natural-uranium nuclear reactors or feeding the enrichment by laser way, or to another fluorination stage (conversion of $UF_4$ into $UF_6$), the uranium hexafluoride obtained being the source of material feeding circuits for uranium enrichment by gas diffusion or ultracentrifuging or laser enrichment.

Consequently, the conversion of the uranium originating from a uranium-bearing concentrate may require, before any other chemical conversion, a stage of purification to remove the impurities which are present.

This purification consists in treating the uranium-bearing concentrate with nitric acid, which not only dissolves the uranium in the form of a uranyl nitrate, but also the impurities which accompany the uranium-bearing concentrate. In the case of uranates these impurities are, for example, for the most important ones, sodium, potassium, ammonium, calcium and magnesium. In the case of uranium-bearing concentrates in the form of oxides, the impurities are present in much smaller quantity.

The solution of impure uranyl nitrate is then treated by the mean of an organophosphorus solvent such as tributylphosphate, which allows a pure uranyl nitrate to be extracted and obtained.

At the term of this purification stage an acidic aqueous effluent is obtained which is practically without uranium, but containing all the impurities which have been converted into soluble nitrates, initially present in the uranium-bearing concentrate.

At present, this effluent which, in this form, cannot be discharged into the natural environment, is neutralized, generally with lime, and then stored in this state in leakproof ponds in which a separation of solid and liquid phases takes place: the liquid phase concentrates naturally by a slow evaporation which is, however, partially compensated by rainfall. However, the surface of these ponds must continually increase to collect and be capable of confining this effluent as soon as it occurs.

It is known from FR-A-2,410,870 a process for the treatment of a residual solution containing ammonium nitrate originating from the nuclear industry. This process consists in spraying the aqueous solution of ammonium nitrate at the top end of a furnace into a region having the decomposition temperature of the said nitrate and in discharging the decomposition compounds at the bottom end.

This process, however:

essentially concerns, the treatment of the ammonium nitrate alone which is decomposed at low temperature, yielding gaseous decomposition residues into the region heated at the decomposition temperature, and not a mixing of metal nitrates in which each nitrates is dependent of a decomposition temperature which is different from the other and much higher than the decomposition temperature of ammonium nitrate and that leads in solid and gaseous decomposition residues;

carries out the spraying of the solution of nitrates to be decomposed through a nozzle. This spraying gives rise to droplets of various sizes which fall into the furnace at various speeds. This phenomenon causes an incomplete decomposition of the nitrate partly because of the sizing difference of the droplets and consequently of a changing kinetics of reaction;

leads in disturbing deposits which clog up the walls of the furnace and which require their regular elimination;

is embodied with means of mounted heating elements, such that a sufficient and homogeneous heat exchange is not allowed.

Because of all those disadvantages, this process can not be applied to the treatment of aqueous effluents containing a mixing of nitrates in solution.

This is why, in order to limit the expansion of these ponds, the invention pursues the objective of treating:

not only the aqueous phase of these ponds;

but also, directly, the aqueous effluents which are rich in impurity nitrates which are generated by the dissolving of uranium-bearing concentrate and the extraction of uranium with an organophosphorus solvent.

Consequently, the subject of the invention is:

a process for recovering the $NO_x$ nitrous vapours by converting them into $HNO_3$ and recycling the $HNO_3$ in the nuclear fuel cycle;

a process for thermal decomposition of an aqueous solution of nitrates of metal impurities or other, which are effluents from the nuclear industry;

a process allowing the heat treatment of the liquid phase of the ponds for storing the aqueous effluents originating from the nuclear fuel cycle;

a process allowing the direct heat treatment of an aqueous phase in the uranium cycle, this aqueous phase resulting from the separation of two phases, one organic, containing the purified uranium, the other aqueous containing all the impurities;

a process allowing the direct treatment of the aqueous phase containing all the impurities by thermal decomposition, without clogging the walls of the plant by the solid phase.

SUMMARY OF THE INVENTION

The invention aims hence at overcoming the disadvantages of the prior art by providing a process which:

decomposes the nitrates contained in an aqueous solution whatever the decomposition temperature of each nitrate present in the said solution;

operates an instantaneous decomposition of those nitrates;

achieves the said decomposition at high temperature;

avoids all disturbing deposit over the walls of the corresponding device.

The process hereby created pursues the objective of carrying out an instantaneous and abrupt contact simultaneously thermal and mechanical between the solution to be treated and a gaseous fluid with high temperature and high mechanical energy.

The invention relates now to a process for recovering, in the form of nitric acid, the nitrate ions contained in the aqueous effluents from the nuclear industry, by thermal decomposition of these nitrate ions in solution, the recovery of the gaseous effluent containing $NO_x$ nitrous vapours and its conversion into $HNO_3$.

According to the invention the process is characterized in that:

a) in a first stage, in a contact zone of a reaction chamber, thermomechanical contact is produced between this solution and a gaseous fluid introduced simultaneously into the reaction chamber, this gaseous fluid being at a temperature that is at least higher than the decomposition temperature of the nitrates in a dominant proportion in the solution and having a mechanical energy that is sufficiently high to cause a fine and homogeneous pulverization of the solution and to carry out instantaneously the decomposition of these nitrates with the formation of $NO_x$ nitrous vapours;

b) in a second stage the gaseous $NO_x$ are converted into $HNO_3$ by cooling and absorption in an aqueous medium.

DETAILED DESCRIPTION OF THE INVENTION

The aqueous solutions of metal nitrates, called impurity nitrates, effluents from the nuclear industry, contain large quantities of inorganic salts, essentially in the said form of nitrates and they however also may contain other salts such as chlorides, sulphates and fluorides of various metal elements.

In the case of solutions originating from the treatment of concentrates of the uranate type, these solutions are rich in calcium, sodium and ammonium nitrates, and also in potassium and magnesium nitrates.

In the case of uranium-bearing concentrates in the form of oxides, these aqueous solutions contain in low quantity metallic impurities such as, for example, iron, calcium, magnesium, aluminium, potassium and other metals.

According to the first stage of the process of the invention, in a contact zone of a reaction chamber, a thermomechanical contact is produced between an aqueous solution of metal nitrates, effluents from the nuclear industry, and a gaseous fluid provided with a high mechanical energy and also provided with a temperature that is at least equal to the decomposition temperature of the metal nitrates in a dominant proportion in the said solution.

The aqueous solution of metal nitrates forming the liquid phase is generally introduced along an appropriate axis in the region of the contact zone and is converted therein into a fine and homogeneous pulverization.

The gaseous fluid provided with a high mechanical and thermal energy is introduced simultaneously with the liquid phase into the contact zone in the form of a symmetrical whirled flow. This whirled flow, coaxial with the main axis of the reaction chamber, has the property of converting the solution of metal nitrates which is introduced as a particularly refined dispersion of microdroplets. This solution is caught by the gaseous fluid, heated beforehand to a high temperature, according to an abrupt and brief mechanical contact, and consequently subjected to a sufficient thermal effect to cause the metal nitrates to decompose instantaneously to a pulverulent mixture made up of oxides, carbonates, other nitrates or other salts which have decomposition temperatures that are much higher than the applied temperature.

The pulverulent mixture of metal oxides, carbonates and other salts originating from the decomposition region may be stored as it is or may be the seat of subsequent mechanical conversions such as compaction, inactivation, vitrification in order to reduce its bulk and insure possibly the states of a definitive storage.

Consequently, the operating conditions of the process according to the invention must control the most complete decomposition of the metal nitrates present in the aqueous solution, with the aim of extracting from it the maximum quantity of recyclable $NO_x$ nitrous vapours.

In general, the aqueous solutions which are rich in these metal nitrates may contain up to approximately 800 g/l of $NO_3^-$ to be recycled, and generally between 50 g/l and 700 g/l of $NO_3^-$ to be recycled.

However, before their decomposition, the aqueous solutions which are rich in these metal nitrates may be concentrated by any suitable means.

The acidity of the liquid phase may vary within a wide range such as being capable of reaching approximately 5 N: it does not rule out the application of the process according to the invention.

The gaseous fluid used in the process of the invention is introduced into the contact zone and provided with a high thermomechanical energy: it is introduced therein in the form of a symmetrical whirled flow.

According to a preferred alternative form the axis of symmetry of the whirled flow of the gaseous fluid introduced coincides not only with the lengthwise axis of the reaction chamber but also with that of the device for injection of the liquid phase.

The heat necessary for the decomposition of the mixture of metal nitrates is supplied by the hot gaseous fluid. This gaseous fluid may consist of air, of inert gas such as nitrogen or of gases resulting from the combustion of:
- a fuel which may be hydrogen or a hydrocarbon preferably gaseous, such as methane, ethane, propane, butane;
- in the presence of an oxidant chosen from the group consisting of air, oxygen or of a mixing of both.

The hot gaseous fluid suitably may have a more or less reducing feature because for example of the presence of a reducing gas, such as hydrogen, carbon oxide or because of an incomplete combustion when the hot gas result from the combustion of a fuel in the presence of an oxidant.

When the gaseous fluid to be introduced is air or an inert gas with wich a reducing gas may be mixed, it may be heated to the desired temperature by an indirect heating device such as, for example, electrical heating external to the combustion chamber. However, when the gaseous fluid to be introduced results from the combustion of a fuel in the presence of an oxidant, it may be generated in a combustion chamber which is independent of the reaction chamber (heating ex situ) or associated with the reaction chamber (heating in situ).

The temperature which must prevail in the contact zone and, a fortiori in the reaction chamber to permit the instantaneous decomposition of the metal nitrates present in the solution to be treated, which is called the "set temperature", is chosen to be higher than or at least equal to 500° C. and preferably higher than or at least equal to 700° C.

The set temperature acts either upon the regulation of the means for heating the gaseous fluid, or upon the feed flow rate of the solution of the metal nitrates to be decomposed.

The reaction chamber in which the decomposition of the metal nitrates is performed and in which is to be found the contact zone where the thermomechanical contact is produced between the aqueous solution of metal nitrates constituting the liquid phase and the gaseous fluid provided with a high thermomechanical energy may be chosen from those described, for example, in French Patent No. 2,257,326, in European Patent No. 0,007,846, in U.S. Pat. No. 3,041,136 or in the article Informations Chimie, No. 342, October 1992.

In the course of the decomposition of metal nitrates in aqueous solution there are obtained, on the one hand, a pulverulent mixture of metal oxides, carbonates and inorganic salts and, on the other hand, a gaseous phase which is separated off.

According to an alternative of the process suitable additives may be incorporated to the solution to be processed, such as for example alumina or silica, in order to make easier the handling of the solid which is obtained or for its possible inactivation.

According to the second stage of the process of the invention the gaseous phase resulting from the decomposition of the metal nitrates present in the aqueous solution which is treated is made up of steam and of $NO_x$ nitrous vapours. This gaseous phase is cooled and absorbed, for example by a recirculating aqueous solution of nitric acid, in an appropriate absorption zone, according to the well known conditions.

The invention will be understood better by virtue of the examples formulated merely by way of illustration.

EXAMPLE 1

This example illustrates the recovery, in the form of nitric acid, of the nitrate ions present in an aqueous phase effluent from the nuclear industry. This aqueous phase, called column stocks, is generated by dissolving uranium-bearing concentrates in nitric acid, extracting uranyl nitrate with an organophosphorus solvent and separating the two phases, one organic and containing uranium, and the other aqueous and containing nitrate ions to be recovered.

This aqueous solution had the following composition, in g/l:

| | |
|---|---|
| $NO_3^-$ | 119 |
| $NH_4^+$ | 12.5 |
| $F^-$ | 1.4 |
| $Cl^-$ | 0.2 |
| $SO_4^-$ | 5.8 |
| $SiO_3^-$ | 0.24 |
| Na | 8.6 |
| K | 1.0 |
| Ca | 0.8 |
| Mg | 1.4 |
| Fe | 1.5 |
| Mo | 0.21 |
| Zr | 0.41 |
| Al | 0.41 |
| P | 0.11 |
| U | 5 ppm |
| $HNO_3$ | 1.1 N |

The free nitric acid present in the aqueous solution was extracted by heating and the solution to be treated according to the process of the invention was concentrated until a nitrate concentration of about 250 g/l was reached.

This latter solution was pulverized in a contact zone of a reaction chamber, as described in European Patent No. 0,007,846, in which the hot gases are produced in situ by complete combustion of propane.

The hot gases produced, provided with a high thermomechanical energy reached the contact zone simultaneously with the liquid phase in the form of a symmetrical whirled flow (coaxially with the device for introducing the solution).

The flow rate of the solution introduced was 20 liters/hour.

The set temperature of decomposition of the nitrates was 800° C.: this temperature controlled the flow rate of propane used in the combustion chamber. The temperature of the gases was approximately 1500° C.

A fine powder of metal oxides, carbonates and inorganic salts not decomposed at this temperature was extracted from the reaction chamber.

As for the gaseous phase resulting from the decomposition of the nitrates present in the aqueous solution which was treated, this was made up of steam and of $NO_x$ nitrous vapours. After cooling, this gaseous phase was introduced into an absorption zone through which a recirculating aqueous solution of $HNO_3$ was passed countercurrentwise. Nitric acid at about 4 N was extracted from this absorption zone.

EXAMPLE 2

This example illustrates the recovery, in the form of nitric acid, of the nitrate ions present in solution in an aqueous phase originating from the supernatant liquids of storage ponds for aqueous effluents produced in the nuclear industry.

The aqueous solution to be treated had the following composition, in g/l:

| | |
|---|---|
| $NO_3^-$ | 625.0 |
| Ca | 95.0 |
| $NH_4^+$ | 62.0 |
| Na | 41.0 |
| K | 12.0 |
| Mg | 6.0 |
| $Cl^-$ | 3.0 |
| Ni | 0.110 |
| Co | 0.025 |

This solution was sprayed in a contact zone of a reaction chamber, as described in French Patent No. 2,257,326, by means of a stream of air heated electrically to a temperature of 1100° C.

The hot gases produced, provided with a high thermomechanical energy, reached the contact zone simultaneously with the liquid phase in the form of a symmetrical whirled flow (coaxially with the device for introducing the solution).

The flow rate of the aqueous solution introduced was 10 liters/hour.

The set temperature of decomposition of the nitrates was 700° C.: this temperature controlled the flow rate of hot gases in the reaction chamber.

A fine powder of metal oxides and of inorganic salts not decomposed at this temperature was extracted from the reaction chamber: the residual nitrates content was of the order of 7% by weight.

As for the gaseous phase resulting from the decomposition of the nitrates present in the aqueous solution which was treated, this was made up of steam and of $NO_x$ nitrous vapours. After cooling, this gaseous phase was introduced into an absorption zone through which a recirculating aqueous solution of $HNO_3$ was passed countercurrentwise. Nitric acid at approximately 4 N was extracted from this absorption zone.

EXAMPLE 3

This example illustrates the recovery, in the form of nitric acid, of the nitrate ions present in an aqueous solution called column stocks, effluent from the uranium-bearing industry: the way in which such an aqueous solution is obtained was described in Example 1.

This aqueous solution had the following composition, in g/l:

| | |
|---|---|
| $NO_3^-$ | 129.1 |
| $NH_4^+$ | 11.5 |
| $F^-$ | 1.4 |
| $Cl^-$ | 0.2 |
| $SO_4^-$ | 5.7 |
| $SiO_3^-$ | 0.19 |
| Na | 4.1 |
| K | 1.3 |
| Ca | 0.9 |
| Mg | 1.4 |
| Fe | 1.5 |
| Mo | 0.20 |
| Zr | 0.27 |
| Al | 0.42 |
| P | 0.10 |
| U | 10 ppm |
| $HNO_3$ | 1.1 N |

This aqueous solution was concentrated under vacuum to give, on the one hand, a pure solution of 0.7 N $HNO_3$ and a solution rich in nitrates to be decomposed.

The pure solution of $HNO_3$ was concentrated until an $HNO_3$ content of 10.2 N was obtained.

The nitrate-rich solution to be decomposed, which contained all the inorganic salts from the abovementioned column stocks effluent, had a nitrate content of 350 g/l and an acidity of 2.1 N.

The nitrate-rich solution to be decomposed was sprayed in the contact zone of a reaction chamber, as described in European Patent No. 0,007,846, in which hot gases are produced in situ by the complete combustion of propane.

The hot gases produced, provided with a high thermomechanical energy, reached the contact zone simultaneously with the liquid phase in the form of a symmetrical whirled flow (coaxially with the device for introducing the solution).

The flow rate of the aqueous solution introduced was 15 liters/hour.

The set temperature of decomposition of the nitrates was 750° C.: this temperature controlled the flow rate of hot gases in the reaction chamber. The temperature of the gases was approximately 1300° C.

A fine powder of metal oxides, carbonates and inorganic salts not decomposed at this temperature was extracted from the reaction chamber.

As for the gaseous phase resulting from the decomposition of the nitrates present in the aqueous solution which was treated, this was made up of steam and of $NO_x$ nitrous vapours. After cooling, this gaseous phase was introduced into an absorption zone through which a recirculating aqueous solution of $HNO_3$ was passed countercurrentwise. Nitric acid at approximately 5 N was extracted from this absorption zone.

What is claimed is:

1. A process for recovering, in the form of nitric acid, the nitrate ions present in a solution of aqueous effluents from the nuclear industry, said solution containing metal nitrates, comprising:

a) in a first stage, in a contact zone of a reaction chamber, thermomechanical contact is produced between said solution of metal nitrates and a gaseous fluid introduced simultaneously into the reaction chamber, said gaseous fluid being introduced into the reaction chamber in the form of a symmetrical whirled flow coaxial with the main axis of the reaction chamber, thereby converting the solution of metal nitrates into a dispersion of microdroplets, said gaseous fluid being at a temperature that is higher than the decomposition temperature of the nitrates in a dominant proportion in the solution and having a mechanical energy that is sufficiently high to obtain a fine pulverization of the solution and to carry out instantaneously the decomposition of these nitrates with the formation of nitrous vapours of $NO_x$, the instantaneous decomposition temperature of the nitrates being higher than 500° C.;

b) in a second stage the gaseous $NO_x$ are converted into $HNO_3$ by cooling and absorption in an aqueous medium.

2. A process according to claim 1, wherein the nitrates of the aqueous solution of metal nitrates are mostly calcium, sodium, ammonium, potassium and magnesium nitrates.

3. A process according to claim 1, wherein the aqueous solution of the metal nitrates contains at most 800 g/l of $NO_3$.

4. A process according to claim 3, wherein the aqueous solution containing the metal nitrates is concentrated prior to the decomposition.

5. A process according to claim 1, wherein the aqueous solution of the metal nitrates has an acidity of at most about 5 N.

6. A process according to claim 1, wherein the axis of symmetry of the whirled flow of the gaseous fluid introduced coincides with the lengthwise axis of the reaction chamber and with the axis of the device for injection of a aqueous phase.

7. A process according to claim 1, wherein the gaseous fluid comprises air or an inert gas.

8. A process according to claim 7, wherein the gaseous fluid comprises nitrogen.

9. A process according to claim 7, wherein the gaseous fluid comprises a hydrogen or carbon monoxide.

10. A process according to claim 1, wherein the gaseous fluid is heated to the temperature higher than the decomposition temperature by an electrical indirect heating device external to the reaction chamber.

11. A process according to claim 1, wherein the gaseous fluid comprises combustion gas.

12. A process according to claim 11, wherein the combustion gas results from the combustion of hydrogen or of a hydrocarbon in the presence of an oxidant.

13. A process according to claim 12, wherein the combustion is of a hydrocarbon chosen from the group consisting of methane, ethane, propane and butane.

14. A process according to claim 12, wherein the oxidant is air, oxygen, or a mixture thereof.

15. A process according to claim 11, wherein the gaseous fluid is made reductant by an incomplete combustion.

16. A process according to claim 12, wherein the gaseous fluid resulting from the combustion of hydrogen or hydrocarbon in the presence of an oxidant is generated in an external combustion chamber independent of the reaction chamber.

17. A process according to claim 1, wherein the temperature of instantaneous decompostion, or set temperature, is at least 700° C.

18. A process according to claim 1, wherein the heating of the gaseous fluid or the feed flow rate of the aqueous solution of metal nitrates to be decomposed is regulated in response to a set decomposition temperature.

19. In a process comprising dissolving uranium-bearing concentrates with a fluid comprising nitric acid, separating uranium values from the resultant fluid, and obtaining an aqueous effluent from the uranium depleted fluid, the improvement comprising conducting the process of claim 1 to recover nitric acid from said aqueous effluent.

20. A process according to claim 3, wherein the $NO_3^-$ concentration is 50 g/l to 700 g/l.

21. A process according to claim 19, wherein the temperature is at least 700° C.

22. A process according to claim 19, further comprising recycling recovered nitric acid to the step of dissolving the uranium-bearing concentrates.

* * * * *